(12) United States Patent
Roy et al.

(10) Patent No.: US 11,159,488 B2
(45) Date of Patent: Oct. 26, 2021

(54) DYNAMIC APPLICATION FIREWALLING IN CLOUD SYSTEMS

(71) Applicant: JPMorgan Chase Bank, N.A., New York, NY (US)

(72) Inventors: Sudeepto Kumar Roy, Karnataka (IN); Santashil Palchaudhuri, Bangalore (IN); Venkatesh Kinthali, Karnataka (IN)

(73) Assignee: JPMorgan Chase Bank, N.A., New York, NY (US)

( * ) Notice: Subject to any disclaimer, the term of this patent is extended or adjusted under 35 U.S.C. 154(b) by 293 days.

(21) Appl. No.: 16/369,551

(22) Filed: Mar. 29, 2019

(65) Prior Publication Data
US 2020/0314065 A1    Oct. 1, 2020

(51) Int. Cl.
*H04L 29/06*      (2006.01)
*H04L 29/12*      (2006.01)

(52) U.S. Cl.
CPC ...... *H04L 63/0263* (2013.01); *H04L 61/1511* (2013.01); *H04L 63/0209* (2013.01); *H04L 63/0236* (2013.01); *H04L 63/30* (2013.01)

(58) Field of Classification Search
CPC .................................................. H04L 63/0263
See application file for complete search history.

(56) References Cited

U.S. PATENT DOCUMENTS

| | | | |
|---|---|---|---|
| 2012/0185913 A1* | 7/2012 | Martinez | H04L 12/66 726/1 |
| 2013/0269023 A1 | 10/2013 | Dilley et al. | |
| 2014/0150051 A1* | 5/2014 | Bharali | H04L 47/286 726/1 |
| 2014/0196141 A1 | 7/2014 | Ji et al. | |
| 2015/0326573 A1 | 11/2015 | Moschetti, Jr. | |
| 2015/0341318 A1* | 11/2015 | Lee | H04L 63/1441 726/11 |

(Continued)

OTHER PUBLICATIONS

Notification of Transmittal of the International Search Report and the Written Opinion of the International Searching in PCT/US2020/025688 dated Jun. 24, 2020.

(Continued)

*Primary Examiner* — Bradley W Holder
(74) *Attorney, Agent, or Firm* — Hunton Andrews Kurth LLP

(57) ABSTRACT

The invention relates to a computer-implemented system and method for efficiently configuring the security rules for application firewalls in a cloud-based infrastructure, the cloud-based infrastructure containing at least one of a virtual machine comprising an application, a Domain Name System (DNS) Agent, and a firewall. The method may comprise requesting, by the application, network address information via a DNS server for a fully qualified domain name (FQDN); intercepting, by the DNS Agent, data packets containing the DNS Server query response; decoding, by the DNS Agent, the DNS query response, and identifying the network address information; and updating a security rule of the firewall, by the DNS Agent, based on the decoded network address information. The method may be implemented to update the security rules of application firewalls across an organization's cloud-based infrastructure.

14 Claims, 4 Drawing Sheets

(56) References Cited

U.S. PATENT DOCUMENTS

2016/0087939 A1* 3/2016 Ji ..................... H04L 63/0245
726/11

OTHER PUBLICATIONS

Russell II. "GCIA Intrusion Detection in Depth." in: GIAC. Jan. 12, 2002 (Jan. 12, 2002) Retrieved on May 29, 2020 (May 29, 2020) from <https://www.giac.org/paper/gcia/514/glac-gcia-assignment-pass/103269> entire document.
Modi el al. "A survey of intrusion detection techniques in cloud." in: Journal of network and computer applications. Jan. 2013 (Jan. 2013) Retrieved on May 29, 2020 (May 29, 2020;W) from <https://openaccess.city.ac.uk/ld/eprint/1737/1/> entire document.

* cited by examiner

DYNAMIC APPLICATION FIREWALLING IN CLOUD SYSTEMS

FIELD OF INVENTION

The present invention relates generally to implementing a dynamic firewall for applications in an organization's cloud-based infrastructure, and more particularly to an efficient method and system for automatically configuring the security rules of application firewalls in a cloud-based infrastructure by intercepting DNS query responses and dynamically programming application firewalls with decoded DNS address information.

BACKGROUND

As organizations are implementing a variety of applications in the cloud, there is an increasing need for a robust application firewalling system that ensures security, while preventing disruption of the normal operation of the applications and/or services residing on the organization's cloud-based infrastructure.

Cloud-based systems may implement application firewalling to control input, output, and/or access to each application or service within an organization's cloud-based infrastructure, and thus securitize the infrastructure as a whole. Each application may be provided with an individualized firewall, so that the firewall can manage on a granular level, the security rules related to that application. Each individual application firewall must maintain security rules, including a list of authorized Internet Protocol (IP) addresses and/or port numbers(s), that their corresponding applications, or services, may communicate with. Conventionally, implementing such rules on every application firewall has been inefficient, burdensome, and time consuming, particularly for large organizations employing thousands of cloud-based applications as each application firewall conventionally must be manually initially configured with such security rules pertaining to each specific application.

A further drawback of conventional application firewall systems is that there is no uniform and efficient way to continuously update authorized network information in the security rules of the application firewalls. External applications, services, and devices constantly change their network information. For example, most businesses and services utilize dynamic IP addresses (as opposed to static) in order to protect their own applications and services from security threats. Each application firewall therefore must be continuously reconfigured with the updated external network addresses in order to ensure the operability of each firewall's application. Unfortunately, conventional techniques to reconfigure the security rules (including the list of authorized addresses) for each application firewall is a manual process that requires the firewall's application to be restarted while its security rules are updated. Further, there is no uniform way to share updated network information across firewalls in a cloud-based infrastructure.

Accordingly, there is a need for a firewall system in a cloud-based infrastructure that automatically initially configures security rules for applications residing on the inside of the firewall and that automatically continuously reconfigures security rules without disrupting normal operation of the firewalls residing on the inside of the firewall.

SUMMARY

Exemplary embodiments of the invention provide a computer-implemented method and system for efficiently configuring the security rules for application firewalls in a cloud-based infrastructure, the cloud-based infrastructure containing at least one of a virtual machine comprising an application, a Domain Name System (DNS) Agent, and a firewall, the method and system further comprising: requesting, by the application, network address information via an external DNS server for a fully qualified domain name (FQDN); intercepting, by the DNS Agent, data packets containing the DNS Server query response; decoding, by the DNS Agent, the DNS query response, and identifying the network address information; and updating a security rule of the firewall, by the DNS Agent, based on the decoded network address information.

According to exemplary embodiments of the invention, the network address information contains one of an IP address and a port number; and the security rule includes a list of authorized external addresses that the application can communicate with. The method and system may further comprise determining, by the DNS Agent, whether the DNS query response relates to a FQDN with address information stored in the list of authorized external addresses; and adding, by the DNS Agent, the address information relating to the FQDN, to the list of authorized external address, if the list does not contain any address information relating to the FQDN. Further the security rules may include a list of unauthorized addresses that the application cannot communicate with, and the method and system further comprise adding, by the DNS Agent, the address information relating to the FQDN to the list of authorized external address, only if the FQDN is not on the list of unauthorized addresses.

According to further exemplary embodiments of the invention, the method and system may further comprise updating, by the DNS Agent, the address information stored in the list of authorized external addresses, if the DNS query response relates to a FQDN with address information stored in the list of authorized external addresses, and the address information differs from the address information stored in the list of authorized external address. The DNS Agent may further by configured to transmit the network address information to the another virtual machine within the cloud-based infrastructure, and update the another virtual machine, a security rule of a firewall of the another virtual machine based on the network address information. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED SUMMARY

Exemplary embodiments of the invention will now be described in order to illustrate various features of the invention. The embodiments described herein are not intended to be limiting as to the scope of the invention, but rather are intended to provide examples of the components, use, and operation of the invention.

The exemplary embodiments herein provide a system and method for automatically configuring the security rules for application firewalls in a cloud-based infrastructure based on intercepted DNS packet query responses. These embodiments advantageously provide efficient initial configurations of application firewall security settings, enable application firewalls to be dynamically updated so that operation of the application need not be interrupted when external network addresses change.

Figure 1:
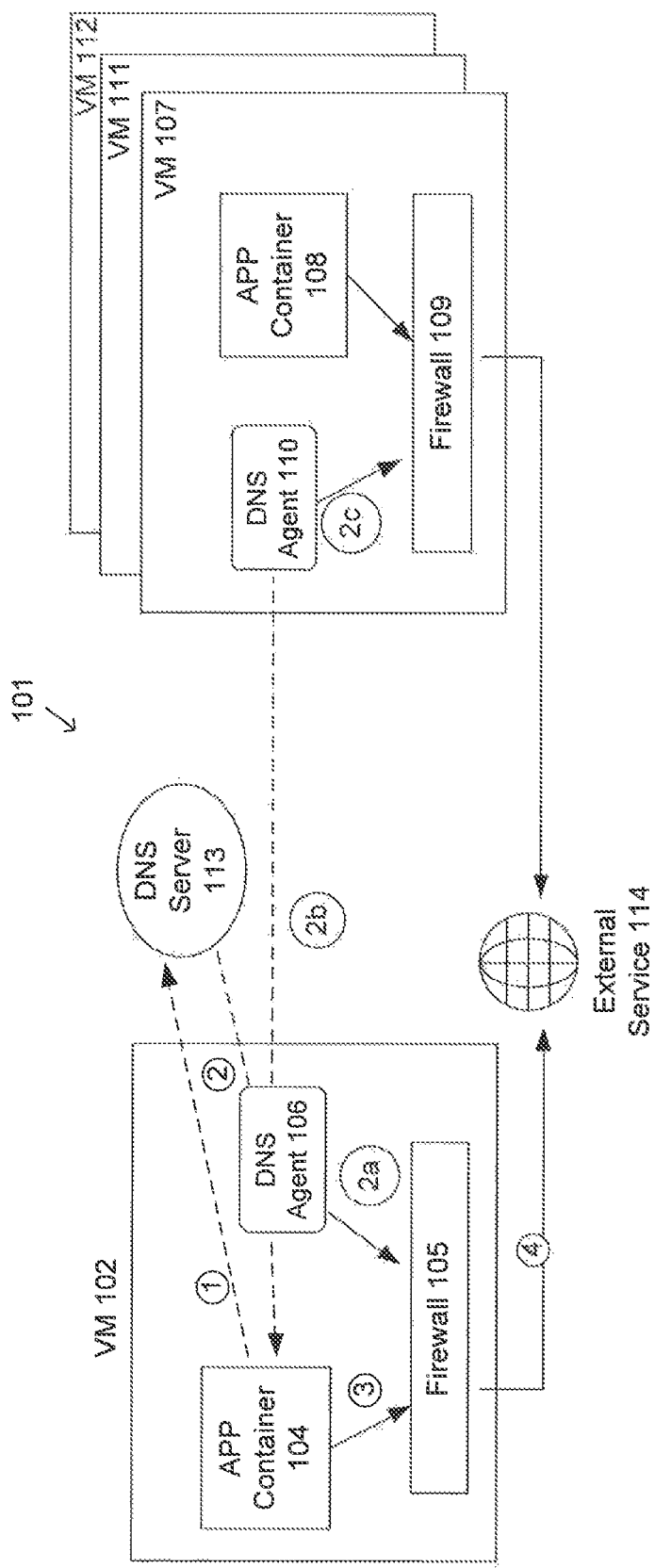
FIG. 1 is a diagram of a system for efficiently configuring the security rules for application firewalls in a cloud-based infrastructure.

Turning to the figures, FIG. 1 illustrates an exemplary embodiment of the invention. A cloud-based infrastructure, 101, may include a plurality of virtual machines (VMs), 102, 107, 111, and 112. Each virtual machine may comprise of an application container represented by App Container 104, 108, Firewall 105, 109 and DNS Agent 106, 110. A virtual machine refers to the emulation of a computer system, and the virtual machine provides the functionality of a physical computer, and may comprise of distributed hardware and software. For example, a virtual machine may be hosted on a plurality of servers in a data center. The virtual machines 102, 107, 111, 112, may include virtual devices that provide the same functionality as physical hardware and have additional benefits in terms of portability, manageability, and security. The APP Containers, 104, 108, may represent an open specification containing files needed to run an application. An APP Container may include an entire runtime environment for an application to work in on a variety of computing environments, and includes the application, its dependencies, libraries and other binaries, and configuration files needed to run it. Firewalls 105, 109, may monitor data packets crossing the boundary of the Virtual Machines 102, 107, respectively, to and from external devices, and networks, and prevent the transmission of packets going to, or coming from unauthorized external addresses. The firewalls may operate at the application layer, network layer, or at other computer networking layers. The firewalls may be implemented in hardware, software, or a combination thereof. The firewall can be anywhere between the application and application or service that the application is trying to establish a connection to.

The DNS Agents 106, 110, may include functionality of a packet sniffer, and may be a computer program, or a piece of computer hardware, that may intercept and log traffic that passes within the virtual machine. In a physical environment, a packet sniffer may be placed between two nodes in the network (e.g. on a physical network switch) in the path that the packets traverse sought to be captured. In a virtual computer, the packet sniffers may be located on a virtual switch associated with the particular virtual machine. The DNS Agent 106 may be operatively coupled to the Firewall 105, so that it may analyze data streams crossing the boundary of the virtual machine 106, or the DNS Agent 106 may be configured so as to analyze a portion of data streams traversing within the virtual machine 102, or a portion of data streams crossing the boundary of the virtual machine 102. The DNS Agents 106, 110, described in this embodiment, may be configured to intercept the DNS query responses from an external DNS Server 113 (as described more fully below) and the APP Containers 104, 108, and configure, and reconfigure security rules of the firewalls 105, 109, based on the address information decoded from the intercepted DNS query responses.

FIG. 1 further illustrates a Domain Name System (DNS) Server 113, and an External Service 114. According to the exemplary embodiment, External Service, 114, is not provided on the cloud infrastructure 101, but may refer to any external service, or application, that an APP Containers 104, 108, communicate with over an external network, such as the internet. Alternatively, the External Service 114 may refer to an application within an organization's cloud based infrastructure when an APP Container may contact a DNS Server so that the APP Container may communicate with the internal application. The DNS Server 113, may be an external (or internal to the cloud-based infrastructure) system that enables an application (or a device), such as APP Container 104, to retrieve address information relating to a fully qualified domain name (FQDN) of a service or application the application seeks to communicate with. The FQDN may represent a domain name that specifies various domain levels of a specified address. The DNS Server 113 relates to a naming system for computers, services, and other resources connected to the Internet or a private network, so to associate various information with domain names assigned to each of the participating networks. DNS Server 113 enables the translation of more readably memorized domain names (e.g. google.com, yahoo.com, etc.) to the numerical network addresses (e.g. IP addresses) needed for locating and identifying computer services and devices with the underlying network protocols. When accessing a website via the internet, for example, an APP Container 104 may first transmit a FQDN, to an external DNS Server on the internet, and the DNS Server 113 may look up address information associated with the FQDN that the application is trying to access. Upon receipt of a query, the DNS Server may perform DNS name resolution, e.g. it may translate the received FQDN, into information that enables the APP Container 104 to connect to an external address, such as an IP address (e.g. 71.45.557.47), port numbers, and other address information, relating to the FQDN query. Other address information may include, for example, Start of Authority (SOA), SMTP mail exchangers (MX), name servers (NS), pointers for reverse DNS lookups (PTR), and domain name aliases (CNAME). The DNS name server 113 typically stores such network address information for FQDNs in a database. Thereafter, the DNS Server 113 may return this information back to the querying APP Container 104. The DNS Server 113 may also be located within the cloud-based infrastructure 101, and may return address information to the APP Container 104, after the APP Container queries an internal DNS Server with a FQDN of another internal APP Container located within the cloud-based infrastructure 101.

In step 1 in FIG. 1 the APP Container 104 may request, via a DNS Server 113, information relating to a fully qualified domain name (FQDN) of an External Service 114 it seeks to communicate with, or that it ordinarily communicates with.

In step 2, in FIG. 1, after the DNS Server 113 performs DNS name resolution, and transmits a query response back to the APP Container 104, the packet sniffer (e.g., the DNS Agent 106) will intercept the data packets corresponding to the response, before the query response reaches the APP Container 104. The DNS Agent is able to identify, and decode the data packet(s) corresponding to the FQDN query response, and then may parse out the FQDN, IP address, and other address information from the intercepted packet. The DNS Agent 106 then can save the decoded address information (relating to FQDN DNS query) in a local cache or another memory location in the virtual computer.

In step 2a, in FIG. 1, the DNS Agent 106 may automatically program the security rules of the Firewall 105 based on the decoded address information saved in the local cache or other memory location. For example, the DNS Agent 106 may compare the decoded address information to a table of the FQDNs, and their associated IP addresses and ports, authorized by the security rules of Firewall 105. The security rules may be stored as a table saved in a virtual server of the virtual machine 102. If the FQDN relating to the request is not in the list of authorized addresses, the DNS Agent 106 may add the FQDN, and the decoded address information (e.g. the IP address) to the authorized list of addresses in the security rules of Firewall 105. If an authorized network address for a particular FQDN is already saved on the table, but the authorized address differs from the decoded address information, then the DNS Agent 106 may reconfigure the security rules of Firewall 105 to include the updated address information of the FQDN. To illustrate, if the IP address associated with a particular FQDN change (as is likely to occur over a given period of time, especially during a disaster recovery scenario), the DNS Agent 106 may detect this change and correspondingly update the IP address associated with the FQDN in the security rules of Firewall 105. The DNS Agent 106 may continuously monitor DNS response query packets, and may reconfigure the security rules of the Firewall 105 with any updated address information in response to intercepting, and decoding any DNS query response packets containing updated address information of authorized FQDNs in real time. This enables the security rules 105 of a firewall to dynamically change, without disrupting operation of the APP Container 104.

The security rules of the Firewall 105 may also contain a "blacklist" of addresses that the APP Container 104 shall not reach out to. If the DNS Agent 106 receives address information from an FQDN query that contains an address related to a FQDN which the APP Container 104 is prohibited from reaching out to (i.e. is a blacklist address) the DNS Agent 106 may be configured to not update the security rules of Firewall 105, which would otherwise reconfigure the security rules to enable the APP Container to communicate with a prohibited external address. Advantageously, this enables increased flexibility and customization to an organization's application firewalling system, as, although the application firewall's security rules, for the most part, will be automatically updated with current network address information, malicious, or known security threats will not inadvertently be added to the firewall security rules by the DNS Agent.

In step 2b, in FIG. 1, the DNS Agent 106 may send the address information to other virtual machines, 107, 111, 112, in the cloud infrastructure environment that it decoded from the DNS query response. In step 2c, in FIG. 1, the DNS Agents of other virtual machines can update the security rules of the firewall in their respective virtual machines based on received address information. For example, a DNS Agent 110, of another virtual environment can be programmed to update any address information that has changed for an authorized FQDN saved in the security rules of Firewall 109. Alternatively, if DNS Agent 109 does not find any address information for the particular FQDN (that the transmitted decoded DNS query response relates to) saved in the security rules of Firewall 109, DNS Agent 109 may add the FQDN and its corresponding address information to the authorized list of addresses in the security rules of Firewall 109. The firewall of the other virtual machines 107, 111, 112, thus may be programmed so to add updated address information intercepted by other DNS Agents on different virtual machines automatically in real time.

In step 3 in FIG. 1, after the DNS query response has been intercepted and decoded by the DNS Agent 106, the DNS query response is transmitted to the APP Container 104. The APP Container 104, using the address information provided in the DNS query response, may thereafter attempt to communicate with External Service 114. The APP Container 114 typically must communicate to the External Service 114 via the Firewall 105. Since the security rules of the Firewall 105 may have been updated in step 2, the APP Container 104 may now automatically be enabled to communicate with External Service 114 whose address information may have changed. Likewise, after the security rules of the firewall of the other virtual machines 107, 111, 112, has been updated, the APP Containers of the other virtual machines 107, 111, 112, may now be enabled to connect to the External Service 114, even if the address information associated with the External Service 114 has changed since the last time the APP Containers in the other virtual machines 107, 111, 112, have communicated with External Service 114.

In the preferred embodiment, the method described in FIG. 1, is advantageously employed whenever the APP Container 104 (or APP Containers of the other virtual machines) 107, 111, 112) operates, so that, whenever there is any changes in external network address information, or the DNS query ages out, the APP Container does the DNS query again, hence refreshing the list of network address (including a list of IP addresses), allowing for dynamic changes to be effected to the security rules of the application firewalls employed in the cloud-based infrastructure.

In a further embodiment of the invention, the DNS query address information decoded and retrieved from DNS Agents in a plurality of virtual machines in an organization's cloud-based infrastructure, can be compiled, and monitored over a period of time. The network information, including the list of IP addresses, can reveal the network topology that the applications in the cloud based-system are communicating with. The network topology can be analyzed, to access, for example, whether, and to the extent, that particular applications residing on the organization's cloud-based infrastructure are communicating with other applications. Each of the applications on the organization's cloud-based infrastructure can be given a traffic score, based on how frequently other applications within the cloud-based infrastructure access the application. If the traffic score of a particular application is lower than a predefined threshold, indicating that other applications in the cloud-based infrastructure, rarely if ever, use the particular application, the system may automatically decommission the particular application. In this way, the organization can optimize their server space, and ensure that the applications employed in the organization's cloud-based infrastructure are not obsolete and/or unused.

A human administrator may monitor DNS query responses cached by each of the DNS Agents on each of the virtual machines of the organization's cloud-based infrastructure. The data cached by each of the DNS Agents, may be saved on a database, and accessed by a device, such as a personal computer, by a network administrator. The administrator can then analyze the compiled DNS query responses, and perform tasks on the application firewalls as necessary using the device.

Further, the network topology of the applications in an organization's cloud-based infrastructure can be analyzed to reveal the extent, and frequency, to which external applications and services are utilized by applications residing in cloud-based-infrastructure.

Figure 2A:
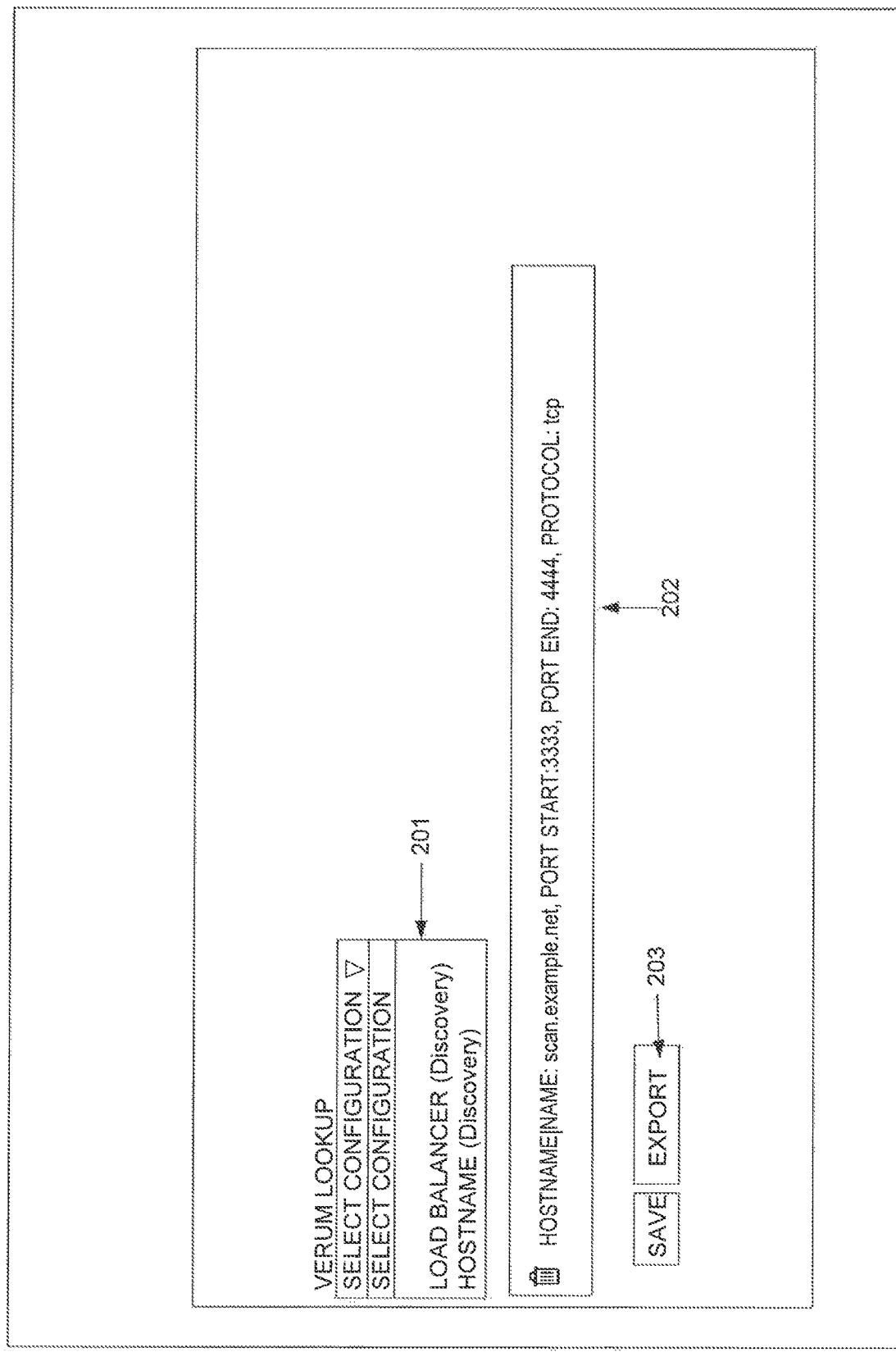
FIG. 2A is a diagram showing a user interface implemented for configuring the application firewall settings using methods of the invention described herein.

FIG. 2A depicts an exemplary user interface of the invention described that may be used by a human administrator managing an organizations' application firewall systems. Through a "Lookup" drop down menu, 201, an administrator may select a variety of endpoints, including "Select Configuration," "Load Balancer (Discovery)," and "Hostname (Discovery)." Each of these endpoints may be resolved by via a DNS server response as described herein. A configuration of an end point in shown in 202. Each end point may be assigned a HOSTNAME, e.g., :scan.example-.net, PORT START, e.g., 3333, PORT END, e.g., 4444, and PROTOCOL, e.g. tcp. An administrator may save or export any manual changes made to any configuration change of endpoints using Save and Export icons in 203, or may save or export changes to a database any changes automatically ascertained via an intercepted DNS server response as described herein. The configuration data may for example, be exported as a Javascript Object Notation (JSON) type file.

Figure 2B:
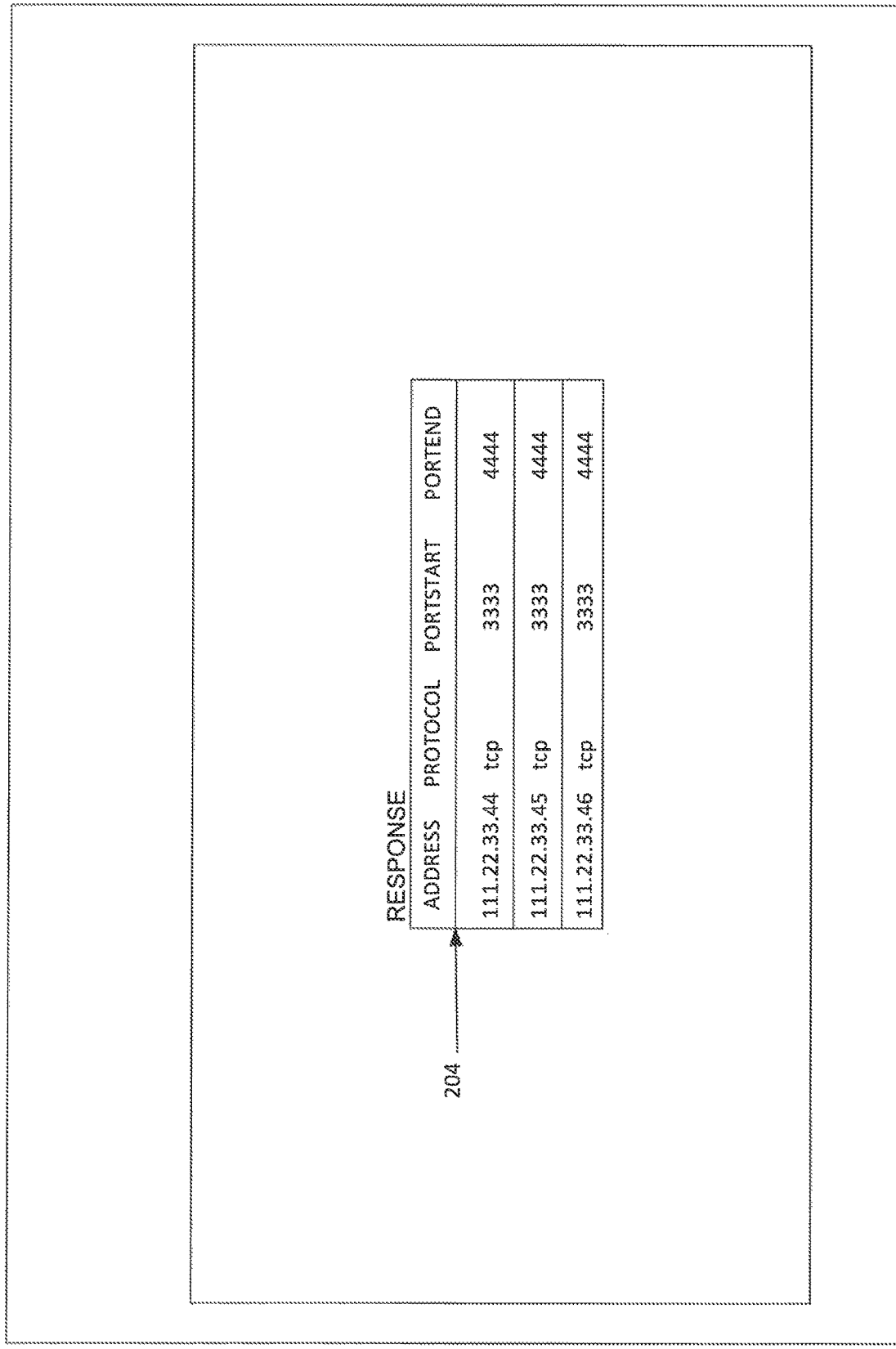
FIG. 2B is a diagram showing a user interface implemented looking up network information stored in the application firewall settings using methods of the invention described herein.

As shown in FIG. 2B, an administrator may also be presented with a user interface, 204, that shows a "Response" table for network data shown pertaining to the selected configuration. For example, for a particular hostname, e.g., scan.example.net, the Response table may display various network information associated therewith, such as IP addresses, e.g., 169.81.90.36, 169.81.90.37, and 169.81.90.38, protocol, portstart, and portend information. The response table may include address information automatically ascertained via an intercepted DNS server response as described herein.

Figure 3:
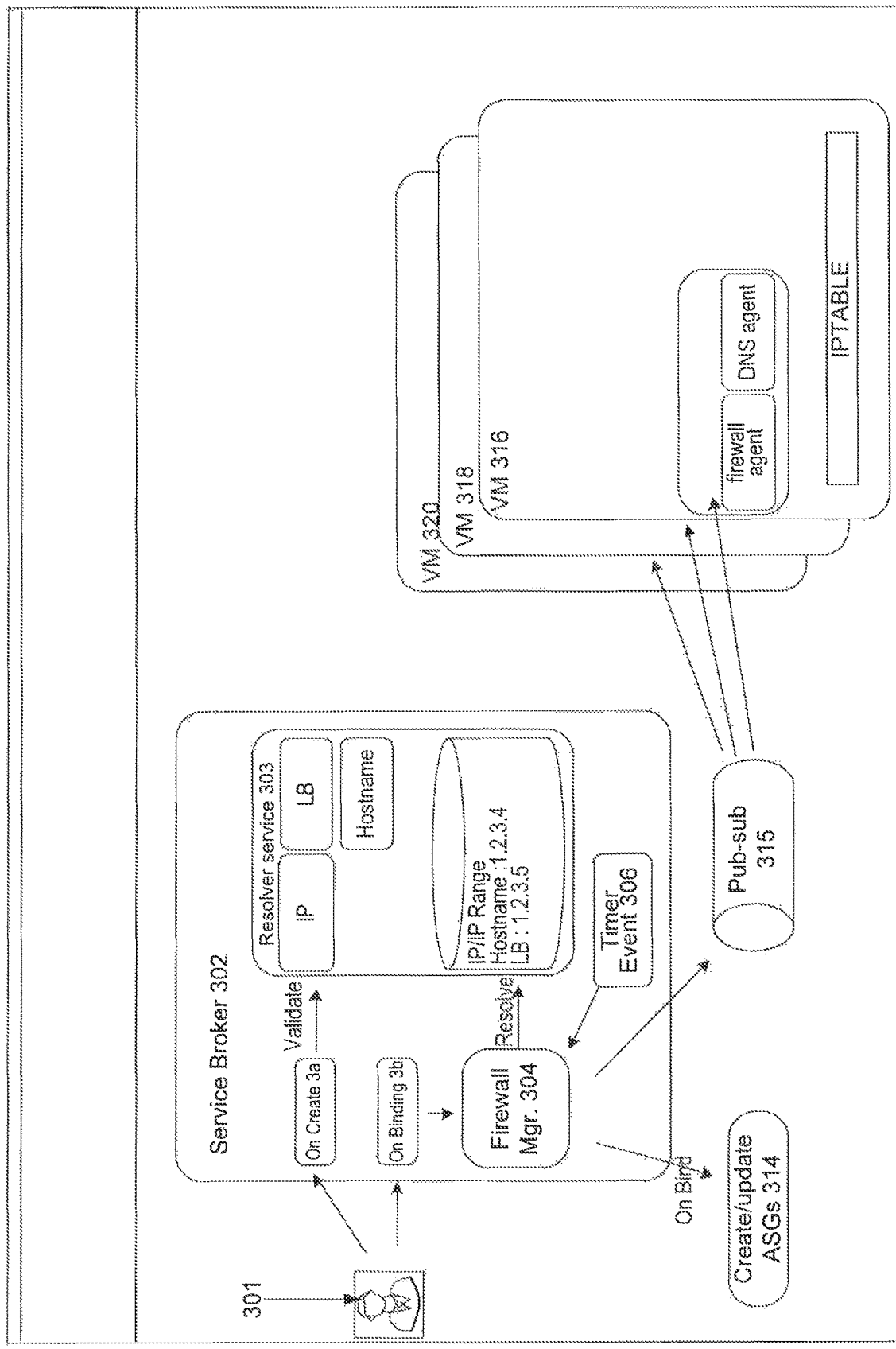
FIG. 3 illustrates an further embodiment of the invention including a system for efficiently configuring the security rules for application firewalls within a cloud-based infrastructure.

FIG. 3 illustrates an alternative embodiment of the present invention. In FIG. 3, a DNS Service Broker 302, is provided to enable dynamic application firewalling across an organization's cloud-based infrastructure.

An Service Broker 302, may provide the functionality for a human administrator 301, to apply security rules to a plurality of firewalls of cloud-based infrastructure. The administrator may create a new network address 3a ("On Create") for the Service Broker 302 to store. For example, an administrator may input an IP address, or Hostname to be saved on an internal cloud based system. A Resolver service 303, in the Service Broker 302, may identify the network address information associated with the particular IP address, Hostname, or other network information associated with the administrator's input.

The administrator may also specify binding credentials at step 3b so that the security rules of internal application firewalls may be configured with new or updated address information via DNS name resolution. A Firewall Manager 304 may be configured to automatically update the network information of particular FQDNs stored in the resolver service 303, via intercepting DNS query responses as described herein. The Firewall Manager 304 in the Service Broker 302 may receive the on binding input from the Firewall Manager 304, and may resolve any network address particulars with the input. The Firewall Manager 304 via the Resolver Service 302 may identify the IP/IP range, Hostname, or LB, associated with a particular On Binding input. A Timer Event 306 may be configured to activate the Firewall Manager 306 to push the on binding request to update the security rules of particular firewalls on the network. For example, after a timer event 306, the Firewall Manager 304 may create or update Advanced Secure Gateways (ASGs), or a publisher/subscriber cloud service (PUB-SUB) 315, may push a binding request to a plurality of virtual machines, 316, 318, 320, each containing a firewall agent (or firewall manager), a DNS Agent, and an IP table. An IP table in each of the virtual machines, 316, 318, 320 may thus be updated with security rules inputted by the on binding request 3B of the administrator 301 via the firewall agent or DNS Agent. The timer event may be manually configured by the administrator so to optimize the setting of security rules across the cloud-based infrastructure.

The devices in FIGS. 1 and 3, including, but not limited, to the virtual machines, APP Containers, DNS Agents, DNS Server, Firewalls, External Services, and Service Broker may be maintained by a plurality of servers, and or computers connected via one or more networks. Such networks may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the devices and the system described herein. As used herein, a user interface may include any hardware, software, or combination of hardware and software used by a processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for efficiently configuring the security rules for application firewalls in a cloud-based infrastructure, the cloud-based infrastructure containing at least one of a virtual machine comprising an application, a Domain Name System (DNS) computer Agent, and a firewall, the method comprising:
- requesting, by the application, network address information via a DNS server for a fully qualified domain name (FQDN);
- intercepting, by the DNS computer Agent, data packets containing a DNS Server query response;
- decoding, by the DNS computer Agent, the DNS Server query response, and identifying the network address information;
- updating a security rule of the firewall, by the DNS computer Agent, based on the decoded network address information wherein the security rule includes a list of authorized external addresses that the application can communicate with;
- determining, by the DNS computer Agent, whether the DNS Server query response relates to a FQDN with address information stored in the list of authorized external addresses; and
- adding, by the DNS computer Agent, the address information relating to the FQDN, to the list of authorized external address, if the list does not contain any address information relating to the FQDN.

2. The computer implemented method of claim 1, wherein the network address information contains an IP address.

3. The computer implemented method of claim 1, wherein the security rules include a list of unauthorized addresses that the application cannot communicate with, and wherein the method further comprises:
- adding, by the DNS computer Agent, the address information relating to the FQDN to the list of authorized external address, only if the FQDN is not on the list of unauthorized addresses.

4. The computer implemented method of claim 1, the method further comprising:
- updating, by the DNS computer Agent, the address information stored in the list of authorized external addresses, if the DNS Server query response relates to a FQDN with address information stored in the list of authorized external addresses, and the address information differs from the address information stored in the list of authorized external address.

5. The computer implemented method of claim 1, further comprising:
- transmitting, by the DNS computer Agent, the network address information to a second virtual machine within the cloud-based infrastructure.

6. The computer implemented method of claim 5, further comprising:
- updating, by the DNS computer Agent of the second virtual machine, a security rule of a firewall of the second virtual machine based on the network address information.

7. The computer implemented method of claim 1, wherein the cloud-based infrastructure includes a plurality of virtual machines, each virtual machine comprising an application, a DNS computer Agent, and a firewall; the method further comprising the step of:
- storing network data over a period of time by the DNS computer Agents from each of the plurality of virtual machines from DNS query responses intercepted by the DNS computer Agents intended for the applications for each of the plurality of virtual machines;
- assigning a score to each of the network addresses stored by each of the DNS computer Agents based on the number of DNS query responses received over the period of time;
- decommissioning an application if a score of a network address of the application is below a predefined threshold.

8. A computer-implemented system for efficiently configuring the security rules for application firewalls in a cloud-based infrastructure, the system comprising:
- a computer processor;
- at least one of a virtual machine, running on the computer processor, comprising an application, a Domain Name System (DNS) computer Agent, and a firewall; wherein the application is configured to request to receive network address information via a DNS server for a fully qualified domain name (FQDN);
- wherein the DNS computer Agent is configured to:
  - intercept data packets containing the DNS Server query response;
  - decode the DNS Server query response, and identify the network address information; and
  - update a security rule of the firewall based on the decoded network address information wherein the security rule includes a list of authorized external addresses that the application can communicate with;
  - determine whether the DNS Server query response relates to a FQDN with address information stored in the list of authorized external addresses; and
  - add the address information relating to the FQDN, to the list of authorized external address, if the list does not contain any address information relating to the FQDN.

9. The computer-implemented system of claim 8, wherein the network address information contains an IP address.

10. The computer-implemented system of claim 8, wherein the security rules include a list of unauthorized addresses that the application cannot communicate with, and wherein the DNS computer Agent is further configured to add the address information relating to the FQDN to the list of authorized external address, only if the FQDN is not on the list of unauthorized addresses.

11. The computer-implemented system of claim 8, wherein the DNS computer Agent is further configured to update the address information stored in the list of authorized external addresses, if the DNS Server query response relates to a FQDN with address information stored in the list of authorized external addresses, and the address information differs from the address information stored in the list of authorized external address.

12. The computer-implemented system of claim 8; wherein the DNS computer Agent is further configured to transmit the network address information to a second virtual machine within the cloud-based infrastructure.

13. The computer implemented system of claim 12, wherein the DNS computer Agent of the second virtual machine is further configured to update a security rule of a firewall of the second virtual machine based on the network address information.

14. The computer implemented system of claim 8, wherein the computer implemented system further comprises a plurality of virtual machines, each virtual machine comprising an application, a DNS computer Agent, and a firewall;
- wherein the DNS computer Agents of each of the plurality of virtual machines are configured to store network data over a period of time from each of the plurality of virtual machines by intercepting DNS query responses and decoding address information;

wherein the computer processor is configured to compile the stored data, and to assign a score to each of the network addresses in the stored data based on the number of DNS query responses received over the period of time;

wherein the computer processor is further configured to decommission an application if a score of a network address of the application is below a predefined threshold.

\* \* \* \* \*